Dec. 21, 1926.
M. V. LIDDELL
1,611,210
COMBINED MACHINE ELEMENT AND LOCK WASHER
Filed July 26, 1923
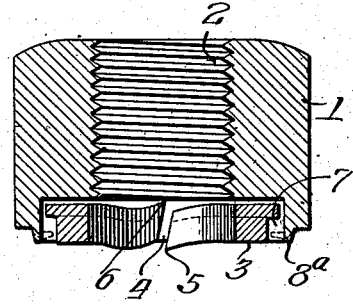
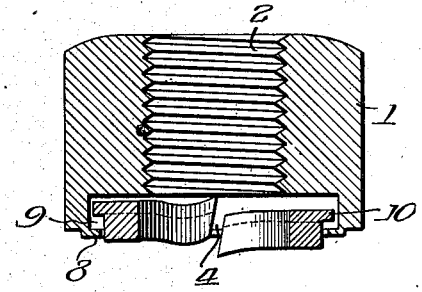
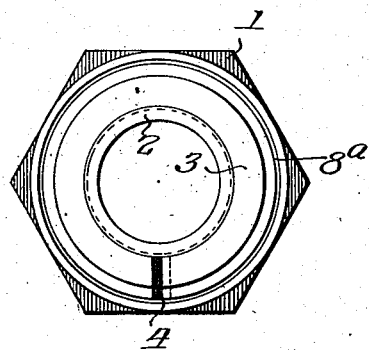
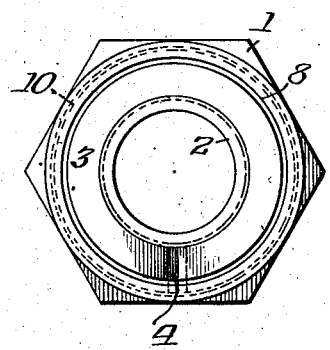
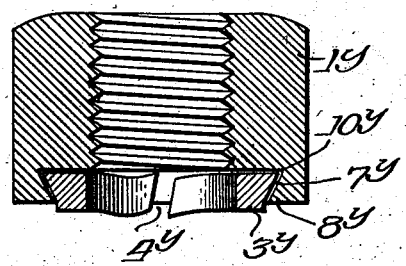
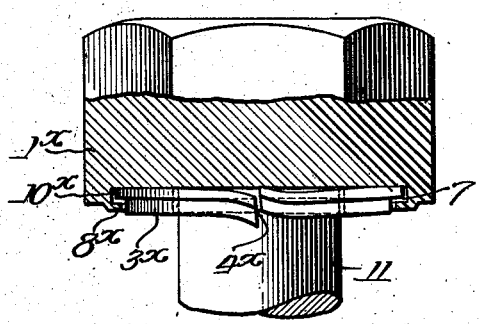
Inventor
Moses Volney Liddell,
By Wilkinson, Husley, Byron & Knight
Att'ys Patented Dec. 21, 1926.

1,611,210

UNITED STATES PATENT OFFICE.

MOSES VOLNEY LIDDELL, OF MATTITUCK, NEW YORK.

COMBINED MACHINE ELEMENT AND LOCK WASHER.

Application filed July 26, 1923. Serial No. 653,863.

This invention relates to means for resisting unintentional rotation of a machine element that is adapted to be rotated at will, and particularly to such means when made in the form of a lock washer. The invention is designed primarily to resist unintended rotation of screw threaded machine elements, such as bolts, nuts, screws, and the like, but it is obviously adapted for use in resisting rotation of other machine elements as well. Also, the invention is preferably embodied in a lock washer of the split ring type, formed with a spiral pitch that renders it resilient axially for the purpose of keeping it in intimate bearing against the parts between which it is confined, and, when used on a screw threaded element, keeping the screw threads in such frictional contact as will resist unscrewing when the element is in use.

The invention proceeds upon the principle of mounting a lock washer upon the machine element in such a manner that it will be permanently carried thereby while permitted rotary and axial movement relatively thereto and without obstructing the face by which it contacts with the surface to which it is applied; features incident to the preferred embodiment of the invention consisting in various methods of establishing the stated relationship between the lock washer and the machine element, as well as certain structural features incident to the different methods of assembly.

In the accompanying drawing, in which several embodiments of the invention are shown by way of illustration—

Figures 1 and 2 are axial sections illustrating one method of assembling a lock washer with a screw threaded nut, Figure 1 showing the original form of nut with receiving cavity for the washer and an axially presented flange on the wall of said cavity, and Figure 2 showing the wall upset in order to overhang the washer and confine it in the cavity.

Figures 3 and 4 are bottom plan views, respectively, of the constructions shown in Figures 1 and 2.

Figure 5 shows another method of confining the lock washer in a cavity formed in a threaded nut; and Figure 6 suggests the assembly of the lock washer, in accordance with the present invention, with the head of a bolt.

Referring to Figures 1 to 4, 1 represents a machine element in the form of a nut having threads 2 by which it may be screwed on to a bolt, tap screw, or other part constructed to receive it. 3 represents a lock washer having a radial split 4 and formed with a spiral set that provides digging-in toes 5, 6, that adapt the washer to function in a well known manner. Washer 3, instead of lying between an end face of the nut 1 and another face opposite thereto, is received into a cavity 7 of the nut and confined therein by means which overhangs the washer axially without obstructing its outer impinging face, for instance an overhanging portion 8 of the circumferential wall 9 of the cavity, the washer being preferably constructed with a circumferential enlargement 10 of some suitable form (shown in Figures 1 to 4 as a rectangular flange) in order to facilitate confinement without retiring the outer annular surface of the washer within the cavity. The overhang 8 (Figures 2 and 4) is preferably formed from an axially presented flange 8ª (Figures 1 and 3) forged, cut in a screw machine, or otherwise formed at the time of producing the nut, and thereafter pressed inwardly to the position shown in dotted lines in Figure 1.

The lock washer assembled with the machine element as described, is free to rotate relatively to the element, and also afforded a limited relative movement in the direction of the axis of rotation.

As suggested in Figure 6, the lock washer may be associated with any other form of machine element, such, for instance, as the head 1ˣ of the machine bolt 11, having the cavity 7 formed on its under face, and a lock washer 3ˣ confined therein by means of the inwardly presented flange 8ˣ on the wall of the cavity overhanging the circumferential flange 10ˣ on the lock washer.

As suggested in Figure 5, the lock washer 3ʸ, having its circumferential enlargement 10ʸ provided by a conic surface on the circumference of the lock washer, may be confined in the nut 1ʸ by means of a conical undercut in the wall of the cavity 7ʸ which provides an overhang 8ʸ to engage the lock washer.

In any form of device shown, as well as others readily deducible from the illustrations selected, the lock washer may be assembled with the machine element by turning it into the cavity after the manner of a screw thread action, the spiral set given to the washer readily permitting such procedure. Or, if the split 4 (Figures 1 to 4), 4ˣ (Figure 6), or 4ʸ (Figure 5), be made sufficiently wide, it would be possible to assemble the lock washer with the machine element by contracting the lock washer circumferentially within its elastic limit and then inserting it into the cavity and permitting it to expand therein; or contracting the washer beyond its elastic limit and forcibly expanding it, after introducing it into the cavity, to give it a new set at a circumferential dimension ample to be engaged by the overhang of the cavity.

I claim:

1. In combination, a rotary machine element, and an axially compressible split lock washer; said washer having an inner face through which it bears against said element, and an outer bearing face; said element and washer being provided with radially extending overlapping means interlocking them against separation in the direction of the axis of the element; the overlapping means of the element being spaced from the body of the element sufficiently to leave the overlapped portion of the washer free to move both axially and circumferentially of the element; said overlapping means being wholly within the plane of the outer bearing surface of the washer.

2. A rotatable machine element having an annular wall defining a cavity presented in the direction of its axis of rotation, and a lock washer confined both radially and axially in said cavity with freedom of rotation relatively to the said element; said cavity being of less depth than the thickness of the lock washer.

3. A rotatable machine element having a cavity concentric with its axis of rotation, and a lock washer in said cavity; said cavity having an overhanging wall confining the lock washer therein; and said washer, having a peripheral projection interlocking with said overhanging wall, being constructed with an outer impinging face in a plane beyond said wall.

4. A rotatable machine element having a cavity concentric with its axis of rotation, and a lock washer in said cavity; said lock washer having a circumferential enlargement within the cavity; said cavity having an overhanging wall in a position to engage said enlargement and thereby confine the lock washer in the cavity; and said lock washer being split and being adapted to enter said cavity by a screw-like action of its enlargement with the overhanging wall.

Signed at Mattituck, L. I., N. Y., this 18th day of July, 1923.

MOSES VOLNEY LIDDELL.